United States Patent
Tao et al.

(10) Patent No.: US 11,100,192 B2
(45) Date of Patent: Aug. 24, 2021

(54) APPARATUS AND METHODS FOR VECTOR OPERATIONS

(71) Applicant: Cambricon Technologies Corporation Limited, Beijing (CN)

(72) Inventors: Jinhua Tao, Beijing (CN); Tian Zhi, Beijing (CN); Shaoli Liu, Beijing (CN); Tianshi Chen, Beijing (CN); Yunji Chen, Beijing (CN)

(73) Assignee: Cambricon Technologies Corporation Limited, Beijing (CN)

( * ) Notice: Subject to any disclaimer, the term of this patent is extended or adjusted under 35 U.S.C. 154(b) by 0 days.

(21) Appl. No.: 16/172,629

(22) Filed: Oct. 26, 2018

(65) Prior Publication Data

US 2019/0065194 A1 Feb. 28, 2019

Related U.S. Application Data

(63) Continuation-in-part of application No. PCT/CN2016/081107, filed on May 5, 2016.

(30) Foreign Application Priority Data

Apr. 26, 2016 (CN) .......................... 201610266989.X

(51) Int. Cl.
*G06F 17/16* (2006.01)
*G06F 9/22* (2006.01)
(Continued)

(52) U.S. Cl.
CPC .............. *G06F 17/16* (2013.01); *G06F 9/223* (2013.01); *G06F 9/3001* (2013.01);
(Continued)

(58) Field of Classification Search
CPC .... G06F 17/16; G06F 9/30105; G06F 9/3013; G06F 9/34; G06F 9/223; G06F 9/3001;
(Continued)

(56) References Cited

U.S. PATENT DOCUMENTS

| 4,888,679 A | 12/1989 | Fossum et al. |
| 5,073,970 A * | 12/1991 | Aoyama ............. G06F 15/8076 708/520 |

(Continued)

FOREIGN PATENT DOCUMENTS

| CN | 1349159 A | 5/2002 |
| CN | 2563635 Y | 7/2003 |

(Continued)

OTHER PUBLICATIONS

201610266989.X—Office Action, dated Apr. 22, 2019, 10 pages. (no English Abstract).

(Continued)

*Primary Examiner* — Farley Abad
(74) *Attorney, Agent, or Firm* — Getech Law; Jun Ye

(57) ABSTRACT

Aspects for vector operations in neural network are described herein. The aspects may include a vector caching unit configured to store a first vector and a second vector, wherein the first vector includes one or more first elements and the second vector includes one or more second elements. The aspects may further include one or more adders and a combiner. The one or more adders may be configured to respectively add each of the first elements to a corresponding one of the second elements to generate one or more addition results. The combiner may be configured to combine a combiner configured to combine the one or more addition results into an output vector.

16 Claims, 8 Drawing Sheets

(51) Int. Cl.

| | |
|---|---|
| *G06F 9/30* | (2018.01) |
| *G06F 9/38* | (2018.01) |
| *G06N 3/063* | (2006.01) |
| *G06N 3/04* | (2006.01) |
| *G06F 9/34* | (2018.01) |
| *G06F 15/80* | (2006.01) |
| *G06F 7/50* | (2006.01) |
| *G06F 7/507* | (2006.01) |
| *G06N 3/08* | (2006.01) |

(52) U.S. Cl.
CPC .......... *G06F 9/3004* (2013.01); *G06F 9/3013* (2013.01); *G06F 9/30036* (2013.01); *G06F 9/30105* (2013.01); *G06F 9/30149* (2013.01); *G06F 9/34* (2013.01); *G06F 9/3855* (2013.01); *G06N 3/04* (2013.01); *G06N 3/063* (2013.01); *G06F 7/50* (2013.01); *G06F 7/507* (2013.01); *G06F 15/8053* (2013.01); *G06N 3/08* (2013.01)

(58) Field of Classification Search
CPC .. G06F 9/30036; G06F 9/3855; G06F 9/3004; G06F 9/30149; G06F 15/8053; G06F 7/50; G06F 7/507; G06F 9/30007; G06N 3/063; G06N 3/04; G06N 3/08
See application file for complete search history.

(56) References Cited

U.S. PATENT DOCUMENTS

| | | | | |
|---|---|---|---|---|
| 5,261,113 | A * | 11/1993 | Jouppi | G06F 9/30036 |
| | | | | 712/222 |
| 5,864,690 | A * | 1/1999 | Henry | G06F 9/26 |
| | | | | 712/208 |
| 6,282,634 | B1 | 8/2001 | Hinds et al. | |
| 7,096,345 | B1 * | 8/2006 | Chen | G06F 9/3838 |
| | | | | 712/217 |
| 7,388,588 | B2 * | 6/2008 | D'Amora | G06F 9/3879 |
| | | | | 345/503 |
| 7,873,812 | B1 * | 1/2011 | Mimar | G06T 1/20 |
| | | | | 712/22 |
| 8,185,571 | B2 * | 5/2012 | Peleg | G06F 7/5443 |
| | | | | 708/524 |
| 2003/0037221 | A1 | 2/2003 | Gschwind et al. | |
| 2005/0226337 | A1 * | 10/2005 | Dorojevets | H04N 19/43 |
| | | | | 375/240.24 |
| 2012/0089819 | A1 * | 4/2012 | Chaudhry | G06F 9/3838 |
| | | | | 712/214 |
| 2016/0224514 | A1 * | 8/2016 | Moudgill | G06F 9/30101 |

FOREIGN PATENT DOCUMENTS

| | | |
|---|---|---|
| CN | 101847093 A | 9/2010 |
| CN | 102156637 A | 8/2011 |
| CN | 102262525 A | 11/2011 |
| CN | 102629238 A | 8/2012 |
| CN | 103699360 A | 4/2014 |
| CN | 104407997 A | 3/2015 |
| CN | 104699465 A | 6/2015 |
| CN | 105027076 A | 11/2015 |
| WO | WO 2017/185392 A1 | 11/2017 |

OTHER PUBLICATIONS

PCT/CN2016/081107—International Search Report, dated Jan. 25, 2017, 10 pages. (no English translation).
T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X" An Accelerator for Sparse Neural Networks, The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
CN201610266989.X, First Office Action, dated Apr. 22, 2019, 10 pages. (No English Translation).
CN201610266989.X, Second Office Action, dated Jan. 6, 2020, 11 pages. (No English Translation).
PCT/CN2016/081107, International Search Report, dated Jan. 25, 2017, 13 pages. (No English Translation).
EP16899903.5, Communication Regarding Oral Proceedings, dated Dec. 4, 2020, 12 pages.
EP16899903.5, Notice Regarding Telephone Consultation, dated Dec. 4, 2020, 3 pages.
EP16885911.4, Communication from EP, dated Dec. 4, 2020, 11 pages.
Christopher H. Chou, et al. "VEGAS: Soft Vector Processor with Scratchpad Memory", FPGA '11, Feb. 27-Mar. 1, 2011, ACM, 10 pages.
Aaron Severance, et al., "Embedded Supercomputing in FPGAs with the VectorBlox MXP Matrix Processor", IEEE, 2013, 10 pages.
Zhiduo Liu, et al. "Accelerator Compiler for the VENICE Vector Processor", FPGA '12, Feb. 2012, ACM, 4 pages.

* cited by examiner

APPARATUS AND METHODS FOR VECTOR OPERATIONS

CROSS-REFERENCE TO RELATED APPLICATIONS

The present invention is a continuation-in-part of PCT Application No. PCT/CN2016/081107, filed on May 5, 2016, which claims priority to commonly owned CN application number 201610266989.X, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, operations between two vectors may be performed frequently in deep learning processes in MMNs.

A known method to perform operations for two vectors in a multilayer artificial neural network is to use a general-purpose processor. However, one of the defects of the method is low performance of a single general-purpose processor which cannot meet performance requirements for usual multilayer neural network operations with respect to a vector with a large number of elements.

Another known method to perform operations for two vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then data of the vector elements may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for vector operations in a neural network. The example apparatus may include a vector caching unit configured to store a first vector and a second vector, wherein the first vector includes one or more first elements and the second vector includes one or more second elements. Further, the example apparatus may include a computation module that includes one or more adders and a combiner. The one or more adders may be configured to respectively add each of the first elements to a corresponding one of the second elements to generate one or more addition results. The combiner may be configured to combine the one or more addition results into an output vector.

Another example apparatus may include a vector caching unit configured to store a first vector and a second vector, wherein the first vector includes one or more first elements and the second vector includes one or more second elements. The example apparatus may further include a computation module that includes one or more multipliers and a combiner. The one or more multipliers may be configured to respectively multiply each of the first elements with a corresponding one of the second elements to generate one or more multiplication results. The combiner may be configured to combine multiplication results into an output vector.

Another example aspect of the present disclosure provides an example method for vector operations in a neural network. The example method may include storing, by a vector caching unit, a first vector and a second vector, wherein the first vector includes one or more first elements and the second vector includes one or more second elements; respectively adding, by one or more adders of a computation module, each of the first elements to a corresponding one of the second elements to generate one or more addition results, and combining, by a combiner of the computation module, the one or more addition results into an output vector.

The example aspect of the present disclosure may include another example method for vector operations in a neural network. The example method may include storing, by a vector caching unit, a first vector and a second vector, wherein the first vector includes one or more first elements and the second vector includes one or more second elements; respectively multiplying, by one or more multiplier of a computation module, each of the first elements with a corresponding one of the second elements to generate one or more multiplication results; and combining, by a combiner, the one or more multiplication results into an output vector.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Various types of vector operations between two vectors may be performed in a neural network. A vector may refer to one or more values formatted in a one-dimensional data structure. The values included in a vector may be referred to as elements. The number of the elements in the vector may be referred to as a length of the vector.

Figure 1:
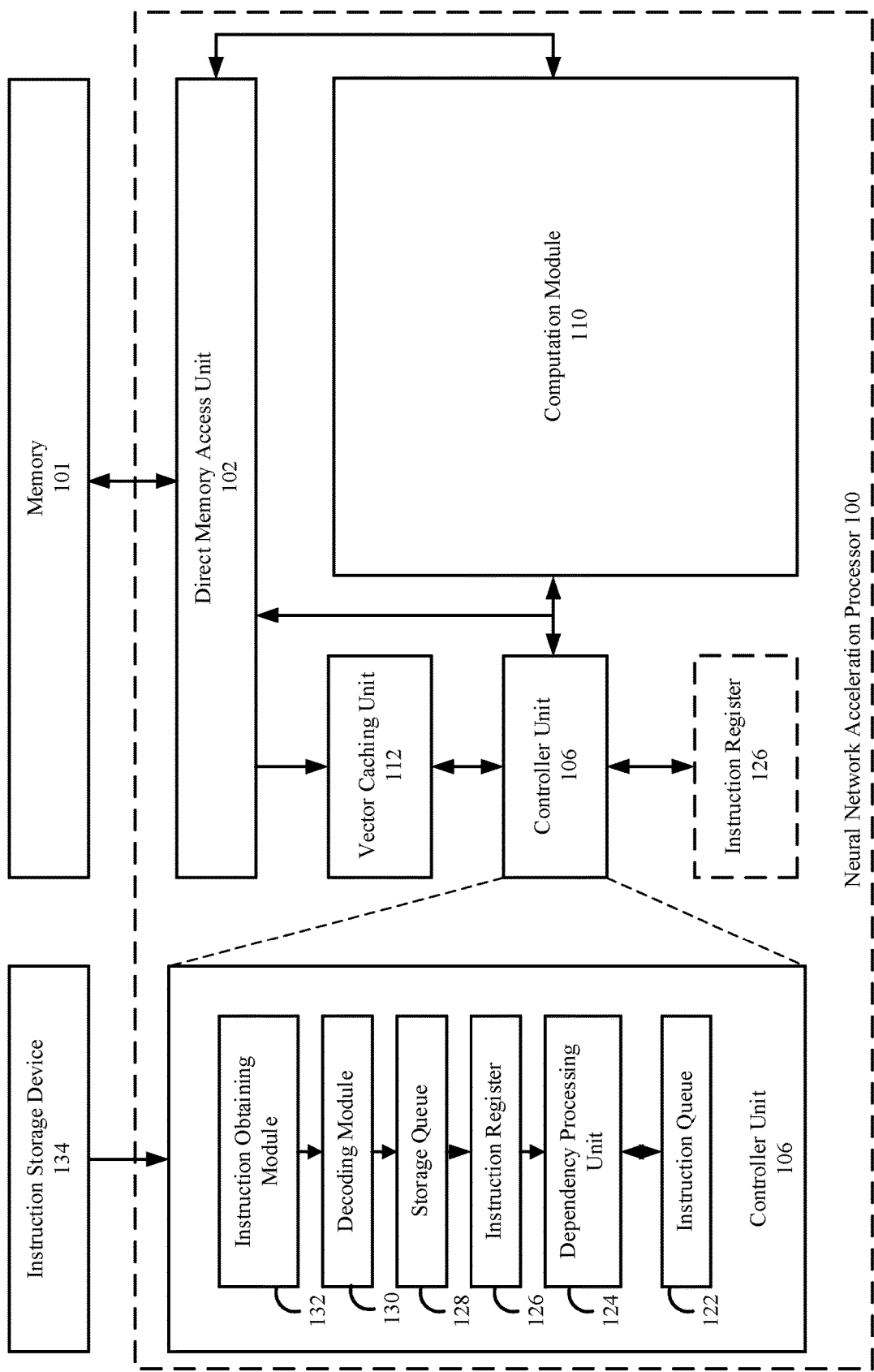
FIG. 1 illustrates a block diagram of an example neural network acceleration processor by which vector operations may be implemented in a neural network.

FIG. 1 illustrates a block diagram of an example neural network acceleration processor by which vector operations may be implemented in a neural network.

As depicted, the example neural network acceleration processor 100 may include a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector operation instruction may originate from an instruction storage device 134 to the controller unit 106. An instruction obtaining module 132 may be configured to obtain a vector operation instruction from the instruction storage device 134 and transmit the instruction to a decoding module 130.

The decoding module 130 may be configured to decode the instruction. The instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in vector addition (VA) instruction may include a starting address of a first vector, a length of the first vector, a starting address of a second vector, a length of the second vector, and an address for an output vector. As depicted, in some examples, the instruction register 126 may be implemented by one or more registers external to the controller unit 106.

Once the relevant values are retrieved, the instruction may be sent to a dependency processing unit 124. The dependency processing unit 124 may be configured to determine whether the instruction has a dependency relationship with the data of the previous instruction that is being executed. This instruction may be stored in the storage queue module 122 until it has no dependency relationship on the data with the previous instruction that has not finished executing. If the dependency relationship does not exist, the controller unit 106 may be configured to decode one of the instructions into micro-instructions for controlling operations of other modules including the direct memory access unit 102 and the computation module 110.

For example, the control unit 106 may receive a vector addition instruction that includes a vector addition (VA) instruction that include a starting address of a first vector, a length of the first vector, a starting address of a second vector, a length of the second vector, and an address for an output vector. According to the VA instruction, the direct memory access unit 102 may be configured to retrieve the first vector and the second vector from the memory 101 according to the respective addresses included in the VA instruction. The retrieved vectors may be transmitted to and stored in the vector caching unit 112.

In some examples, the controller unit 106 may receive a vector-add-scalar (VAS) instruction that includes a starting address of a vector, a length of the vector, a scalar value, and an address for an output vector. According to the VAS instruction, the direct memory access unit 102 may be configured to retrieve the vector from the memory 101 according to the address. The vector may be transmitted to and stored in the vector caching unit 112. The scalar value included in the VAS instruction may be stored in the instruction caching unit 104. The instruction caching unit 104 may be implemented as a scratchpad memory, e.g., Dynamic random-access memory (DRAM), embedded DRAM (eDRAM), memristor, 3D-DRAM, non-volatile memory, etc.

In some examples, the controller unit 106 may receive a vector-subtraction (VS) instruction that includes a starting address of a first vector, a length of the first vector, a starting address of a second vector, a length of the second vector, and an address for an output vector. According to the VS instruction, the direct memory access unit 102 may be configured to retrieve the first vector and the second vector from the memory 101 according to the respective addresses included in the VS instruction. The retrieved vectors may be transmitted to and stored in the vector caching unit 112.

In some examples, the controller unit 106 may receive a scalar-subtract-vector (SSV) instruction that include a starting address of a vector, a length of the vector, a scalar value, and an address for an output vector. According to the SSV instruction, the direct memory access unit 102 may be configured to retrieve the vector from the memory 101 according to the address. The vector may be transmitted to and stored in the vector caching unit 112. The scalar value included in the SSV instruction may be stored in the instruction caching unit 104.

In some examples, the controller unit 106 may receive a vector-multiply-vector (VMV) instruction that includes a starting address of a first vector, a length of the first vector, a starting address of a second vector, a length of the second vector, and an address for an output vector. According to the VMV instruction, the direct memory access unit 102 may be configured to retrieve the first vector and the second vector from the memory 101 according to the respective addresses included in the VMV instruction. The retrieved vectors may be transmitted to and stored in the vector caching unit 112.

In some examples, the controller unit 106 may receive a vector-multiply-scalar (VMS) instruction that include a starting address of a vector, a length of the vector, a scalar value, and an address for an output vector. According to the VMS instruction, the direct memory access unit 102 may be configured to retrieve the vector from the memory 101 according to the address. The vector may be transmitted to and stored in the vector caching unit 112. The scalar value included in the VMS instruction may be stored in the instruction caching unit 104.

In some examples, the controller unit 106 may receive a vector-divide (VD) instruction that includes a starting address of a first vector, a length of the first vector, a starting address of a second vector, a length of the second vector, and an address for an output vector. According to the VD instruction, the direct memory access unit 102 may be configured to retrieve the first vector and the second vector from the memory 101 according to the respective addresses included in the VD instruction. The retrieved vectors may be transmitted to and stored in the vector caching unit 112.

In some examples, the controller unit 106 may receive a scalar-divide-vector (SDV) instruction that include a starting address of a vector, a length of the vector, a scalar value, and an address for an output vector. According to the SDV instruction, the direct memory access unit 102 may be configured to retrieve the vector from the memory 101 according to the address. The vector may be transmitted to and stored in the vector caching unit 112. The scalar value included in the SDV instruction may be stored in the instruction caching unit 104.

The above mentioned instructions may be formatted as follows and may be stored in the instruction caching unit 104:

|  | Register 0 | Register 1 | Register 2 | Register 3 | Register 4 |
|---|---|---|---|---|---|
| VA | Starting address of the first vector | Length of the first vector | Starting address of the second vector | Length of the second vector | Address for output result |
| VAS | Starting address of a vector | Length of the vector | Address for output result | Scalar value | |
| VS | Starting address of the first vector | Length of the first vector | Starting address of the second vector | Length of the second vector | Address for output result |
| SSV | Starting address of a vector | Length of the vector | Address for output result | Scalar value | |
| VMV | Starting address of the first vector | Length of the first vector | Starting address of the second vector | Length of the second vector | Address for output result |
| VMS | Starting address of a vector | Length of the vector | Address for output result | Scalar value | |
| VD | Starting address of the first vector | Length of the first vector | Starting address of the second vector | Length of the second vector | Address for output result |
| SDV | Starting address of a vector | Length of the vector | Address for output result | Scalar value | |

Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Figure 2A:
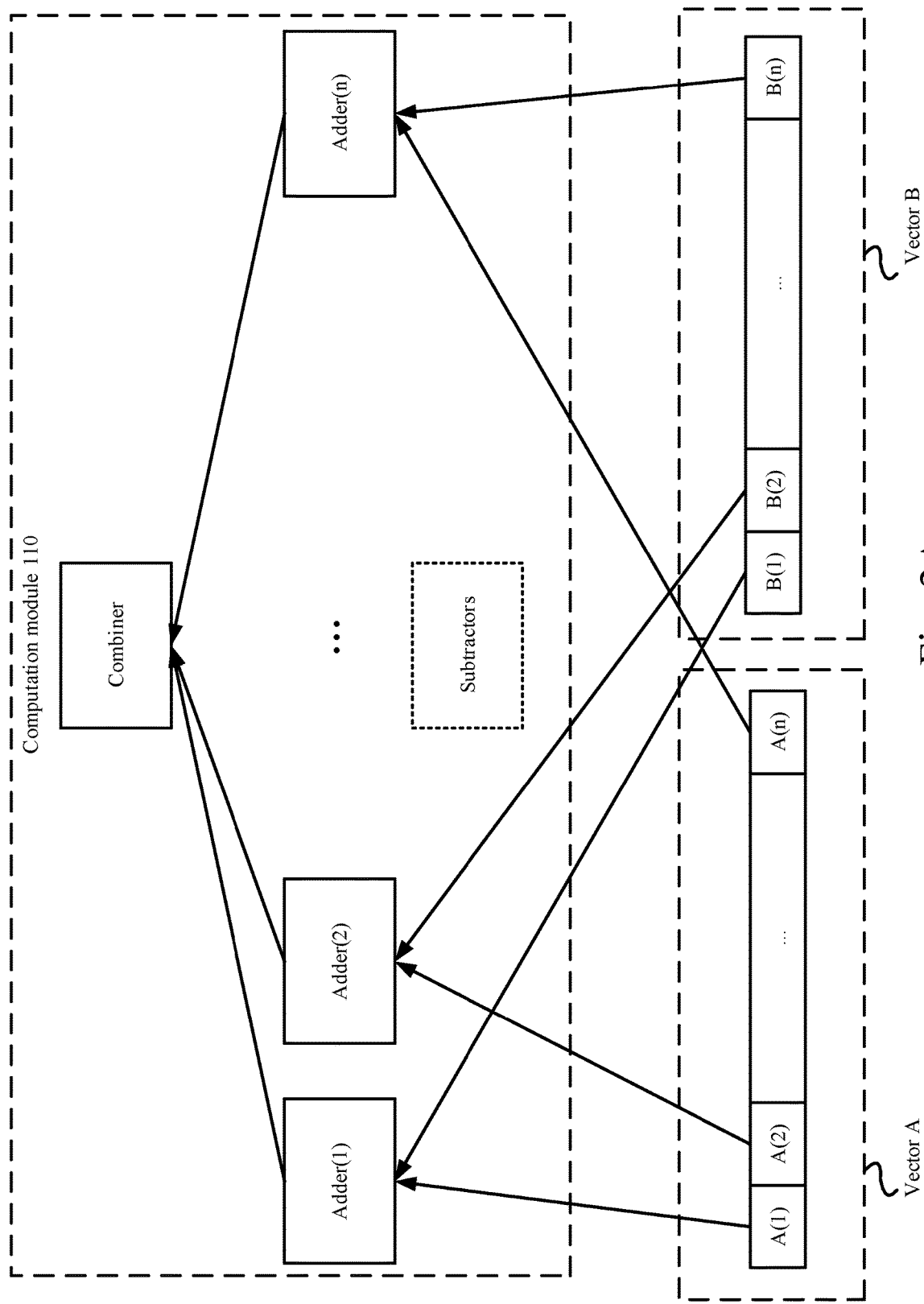
FIG. 2A illustrates an example vector addition process that may be performed by the example neural network acceleration processor.

FIG. 2A illustrates an example vector addition process that may be performed by the example neural network acceleration processor.

As depicted, a first vector ("Vector A") may include one or more elements respectively denoted as A(1), A(2), . . . A(n) and, similarly, a second vector ("Vector B") may include one or more elements respectively denoted as B(1), B(2), . . . B(n). The elements in the first vector may be referred to as first elements. The elements in the second vector may be referred to as second elements.

The computation module 110 may include one or more adders. In response to a VA instruction, each of the adders may be configured to add a first element in the first vector to a corresponding second element in the second vector e.g., A(1) to B(1), A(2) to B(2), . . . A(n) to B(n). The addition results generated respectively by the one or more adders may be directly transmitted to a combiner. In other words, the addition results may be transmitted to the combiner without being temporarily stored in the vector caching unit 112. The combiner may be configured to combine the addition results to generate an output vector. The output vector may be represented as A(1)+B(1), A(2)+B(2), . . . A(n)+B(n).

In response to a VAS instruction, the adders may be configured to add a scalar value to each element in the first vector. The output vector may be represented as A(1)+S, A(2)+S, . . . A(n)+S.

In an example of a VS instruction, the computation module 110 may include one or more subtractors configured to subtract the second elements of the second vector from the first elements in the first vector. The combiner may be similarly configured to combine the subtraction results to generate an output vector. The output vector may be represented as A(1)−B(1), A(2)−B(2), . . . A(n)−B(n).

In response to an SSV instruction, the subtractors may be configured to subtract the scalar value from each element in the first vector. The output vector may be represented as A(1)−S, A(2)−S, . . . A(n)−S.

Figure 2B:
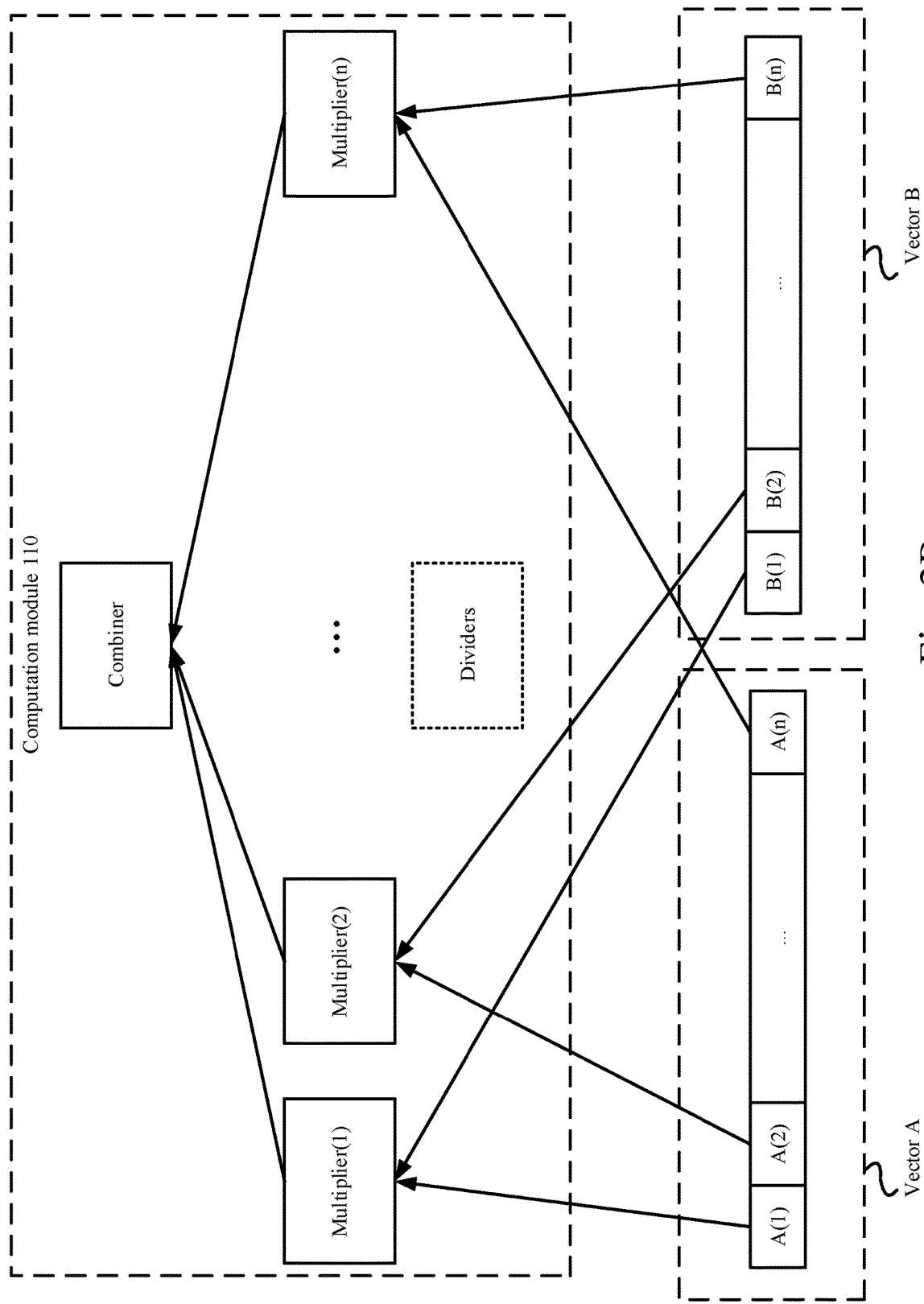
FIG. 2B illustrates an example vector multiplication process that may be performed by the example neural network acceleration processor.

FIG. 2B illustrates an example vector multiplication process that may be performed by the example neural network acceleration processor.

Similarly, a first vector ("Vector A") may include one or more elements respectively denoted as A(1), A(2), . . . A(n) and, similarly, a second vector ("Vector B") may include one or more elements respectively denoted as B(1), B(2), . . . B(n). The elements in the first vector may be referred to as first elements. The elements in the second vector may be referred to as second elements.

The computation module 110 may include one or more multipliers. In response to a VMV instruction, each of the multipliers may be configured to multiply a first element in the first vector with a corresponding second element in the second vector, e.g., A(1) with B(1), A(2) with B(2), . . . A(n) with B(n). The multiplication results generated respectively by the one or more multipliers may be directly transmitted to the combiner. In other words, the multiplication results may be transmitted to the combiner without being temporarily stored in the vector caching unit 112. The combiner may be similarly configured to combine the multiplication results to generate an output vector. The output vector may be represented as A(1)*B(1), A(2)*B(2), . . . A(n)*B(n).

In response to a VMS instruction, each of the multipliers may be configured to multiply a first element in the first vector with a scalar value. The combiner may be similarly configured to combine the multiplication results to generate an output vector. The output vector may be represented as A(1)*S, A(2)*S, . . . A(n)*S.

In an example of a VD instruction, the computation module 110 may include one or more dividers configured to divide the first element by the second elements correspondingly. The combiner may be similarly configured to combine the division results to generate an output vector. The output vector may be represented as A(1)/B(1), A(2)/B(2), . . . A(n)/B(n).

In response to an SDV instruction, the dividers may be configured to divide the first elements by a scalar value. The combiner may be similarly configured to combine the division results to generate an output vector. The output vector may be represented as A(1)/S, A(2)/S, . . . A(n)/S.

Figure 3:
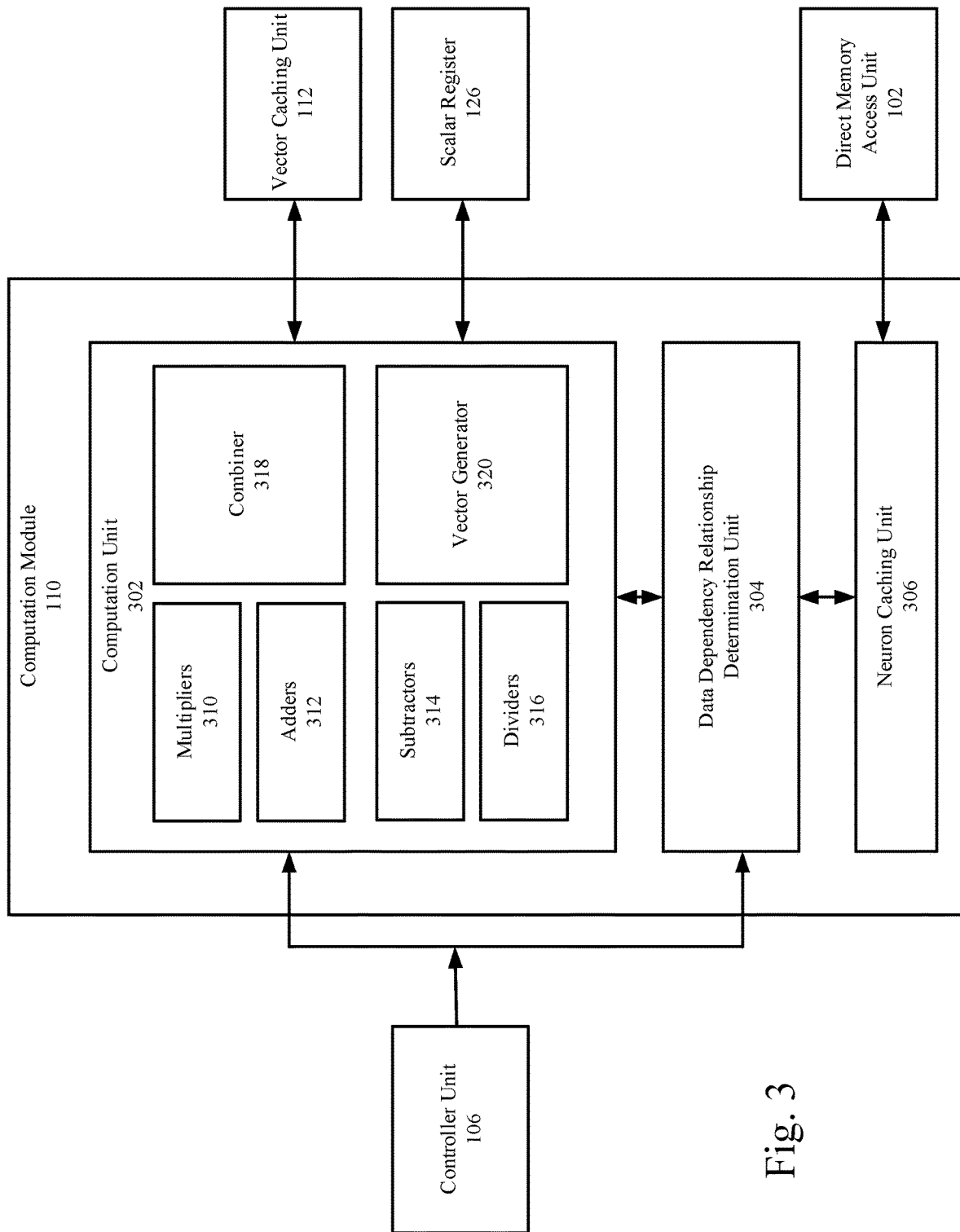
FIG. 3 illustrates an example computation module in the example neural network acceleration processor by which vector operations may be implemented in a neural network.

FIG. 3 illustrates an example computation module in the example neural network acceleration processor by which vector operations may be implemented in a neural network;

As depicted, the computation module 110 may include a computation unit 302, a data dependency relationship determination unit 304, a neuron caching unit 306. The computation unit 302 may further include one or more multipliers 310, one or more adders 312, an inverter 314, a reciprocal calculator 316, a combiner 318, and a vector generator 320.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the first vector and the second vector.

In some examples, the computation unit 320 may receive a scalar value from the instruction caching unit 104. The vector generator 320 may be configured to expand the scalar value into the first vector or the second vector. In other words, the vector generator 320 may overwrite the elements in the first vector or the second vector with the scalar value. Alternatively, the vector generator 320 may generate a vector of a same length as the first vector or the second vector. Elements of the generated vector may be assigned with the scalar value.

Thus, with respect to a VAS, SSV, VMS, or SDV instruction that involves a scalar value and a vector, the vector generator 320 may convert the scalar value into a vector. The operations may be performed between a vector converted from the scalar value and a received vector.

The computation unit 302 may be configured to receive the micro-instructions decoded from the vector operation instruction from the controller unit 106. In the example that the micro-instructions instruct the computation module 110 to perform a vector addition operation to two vectors, the one or more adders 312 may be respectively configured to add a first element in the first vector to a corresponding second element in the second vector. The first vector and the second vector may be retrieved from the vector caching unit 112 or may be expanded from the scalar value from the instruction caching unit 104.

The addition results generated respectively by the one or more adders may be directly transmitted to the combiner 318 without being temporarily stored in the vector caching unit 112 or the neuron caching unit 306. The combiner 318 may be configured to combine the addition results to generate an output vector. The output vector may be represented as A(1)+B(1), A(2)+B(2), . . . A(n)+B(n).

In response to a VAS instruction, the adders 312 may be configured to add a scalar value to each element in the first vector. The output vector may be represented as A(1)+S, A(2)+S, . . . A(n)+S.

In response to a VS instruction, the subtractors 314 may be configured to subtract the second elements of the second vector from the first elements correspondingly. The combiner 318 may be similarly configured to combine the addition results to generate an output vector. The output vector may be represented as A(1)–B(1), A(2)–B(2), . . . A(n)–B(n).

In response to an SSV instruction, the subtractors 314 may be configured to subtract the scalar value from each element in the first vector. The output vector may be represented as A(1)–S, A(2)–S, . . . A(n)–S.

In the example that the micro-instructions instruct the computation module 110 to perform a vector multiplication operation to two vectors, each of the multipliers 310 may be configured to multiply a first element in the first vector with a corresponding second element in the second vector, e.g., A(1) with B(1), A(2) with B(2), A(n) with B(n). The multiplication results generated respectively by the one or more multipliers may be directly transmitted to the combiner 318 without being temporarily stored in the vector caching unit 112 or the neuron caching unit 306. The combiner 318 may be similarly configured to combine the multiplication results to generate an output vector. The output vector may be represented as A(1)*B(1), A(2)*B(2), . . . A(n)*B(n).

In response to a VMS instruction, each of the multipliers 310 may be configured to multiply a first element in the first vector with a scalar value. The combiner may be similarly configured to combine the multiplication results to generate an output vector. The output vector may be represented as A(1)*S, A(2)*S, . . . A(n)*S.

In some examples, the dividers 316 may be configured to divide the first elements by the second elements of the second vector The combiner 318 may be similarly configured to combine the division results to generate an output vector. The output vector may be represented as A(1)/B(1), A(2)/B(2), . . . A(n)/B(n).

In response to an SDV instruction, the dividers 316 may be configured to divide the first elements by a scalar value. The combiner may be similarly configured to combine the division results to generate an output vector. The output vector may be represented as A(1)/S, A(2)/S, . . . A(n)/S.

Figure 4A:
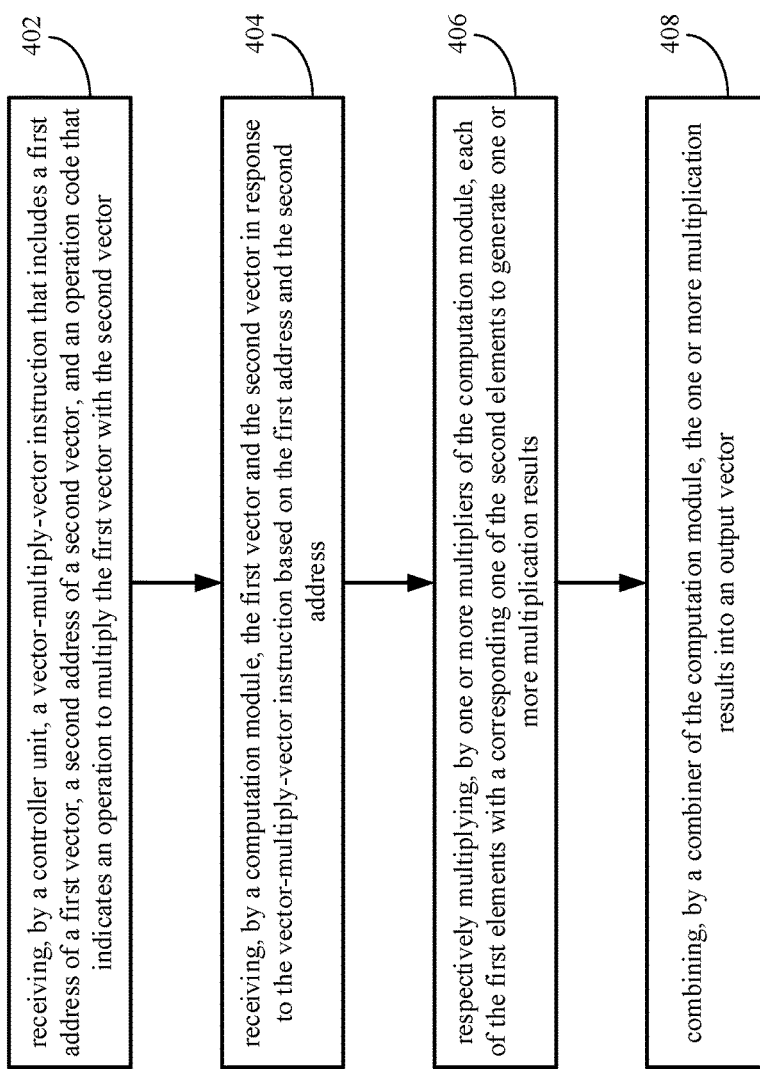
FIG. 4A illustrates a flow chart of an example method for performing vector multiplication between two vectors in a neural network.

FIG. 4A illustrates a flow chart of an example method 400 for performing vector multiplication between two vectors in a neural network. The method 400 may be performed by one or more components the apparatus of FIGS. 1 and 3.

At block 402, the example method 400 may include receiving, by a controller unit, a vector-multiply-vector instruction that includes a first address of a first vector, a second address of a second vector, and an operation code that indicates an operation to multiply the first vector with the second vector. For example, the controller unit 106 may receive a vector-multiply-vector instruction that includes a first address of a first vector, a second address of a second vector, and an operation code that indicates an operation to multiply the first vector with the second vector. A first vector may include one or more elements respectively denoted as A(1), A(2), . . . A(n) and, similarly, a second vector may include one or more elements respectively denoted as B(1), B(2), . . . B(n).

At block 404, the example method 400 may include receiving, by a computation module, the first vector and the second vector in response to the vector-multiply-vector instruction based on the first address and the second address. For example, the computation module 110 may be configured to receive the first vector and the second vector in response to the vector-multiply-vector instruction.

At block 406, the example method 400 may include respectively multiplying, by one or more multipliers of the computation module, each of the first elements with a corresponding one of the second elements to generate one or more multiplication results. For example, the one or more multipliers 310 may be respectively configured to multiply a first element in the first vector with a corresponding second element in the second vector. The multiplication results generated respectively by the one or more multipliers 310 may be directly transmitted to the combiner 318 without being temporarily stored in the vector caching unit 112 or the neuron caching unit 306.

At block 408, the example method 400 may include combining, by a combiner of the computation module, the one or more multiplication results into an output vector. For example, the combiner 318 may be configured to combine the multiplication results to generate an output vector. The output vector may be represented as A(1)*B(1), A(2)*B(2), . . . A(n)*B(n).

Figure 4B:
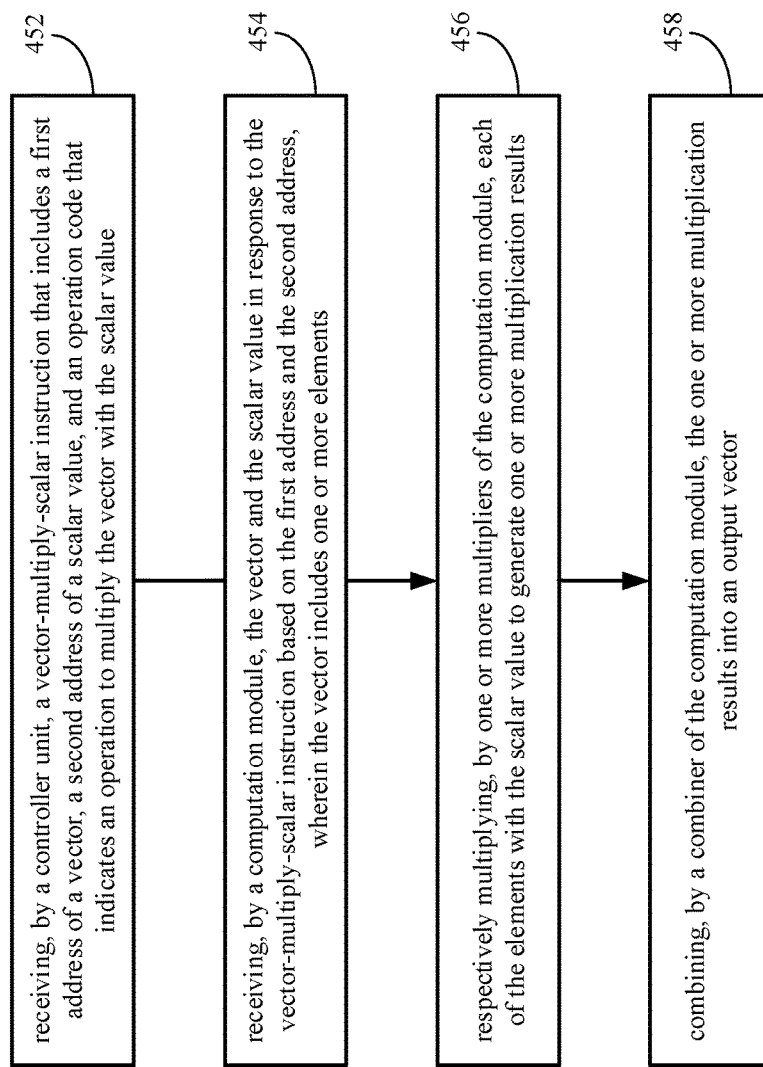
FIG. 4B illustrates a flow chart of an example method for performing vector multiplication between a vector and a scalar value.

FIG. 4B illustrates a flow chart of an example method 401 for performing vector multiplication between a vector and a scalar in a neural network. The method 401 may be performed by one or more components the apparatus of FIGS. 1 and 3.

At block 452, the example method 401 may include receiving, by a controller unit, a vector-multiply-scalar instruction that includes a first address of a vector, a second address of a scalar value, and an operation code that indicates an operation to multiply the vector with the scalar value. For example, the controller unit 106 may receive a VMS instruction that includes a first address of a vector, a second address of a scalar value, and an operation code that indicates an operation to multiply the vector with the scalar value.

At block 454, the example method 401 may include receiving, by a computation module, the vector and the scalar value in response to the vector-multiply-scalar instruction based on the first address and the second address. For example, the computation module 110 may be configured to receive a first vector A and a scalar value.

At block 456, the example method 401 may include respectively multiplying, by one or more multipliers of the computation module, each of the elements with the scalar value to generate one or more multiplication results. For example, the multipliers 310 may be configured to multiply the scalar value with each element in the first vector.

At block 458, the example. the example method 401 may include combining, by a combiner of the computation module, the one or more multiplication results into an output vector. For example, the combiner 318 may be configured to combine the multiplication results into an output vector. The output vector may be represented as A(1)*S, A(2)*S, . . . A(n)*S.

Figure 5A:
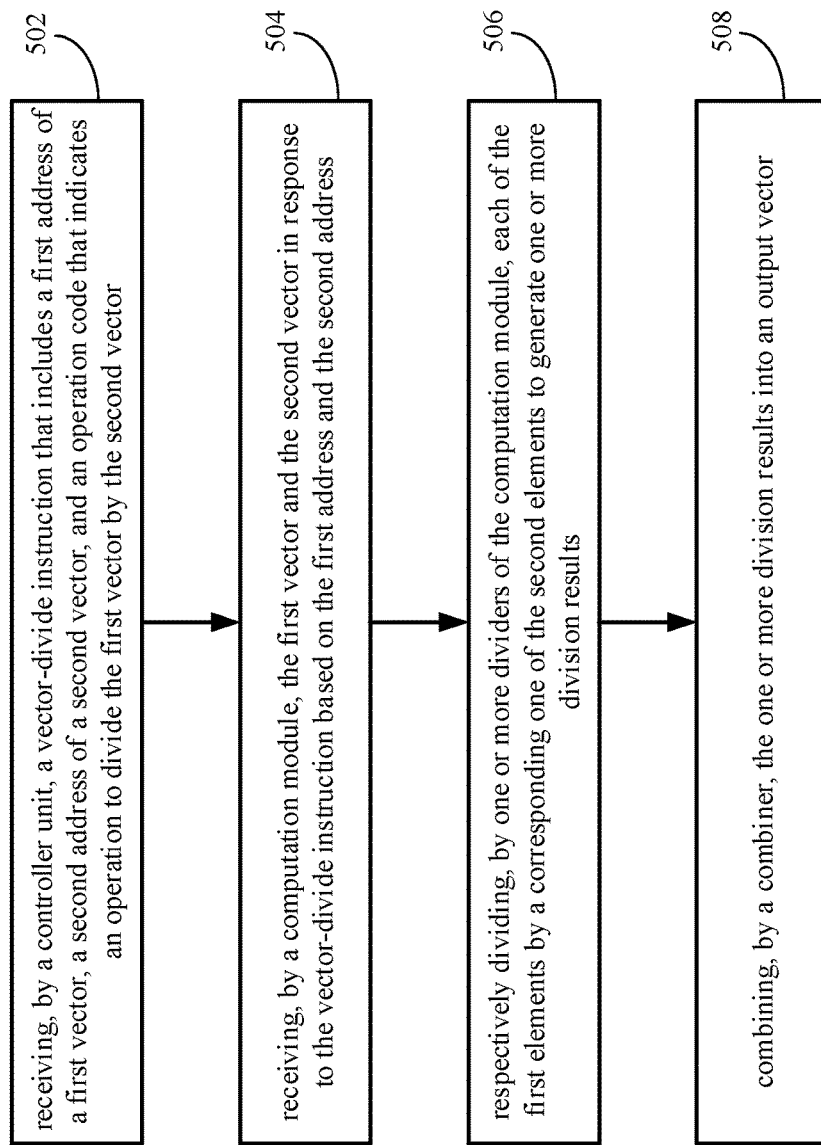
FIG. 5A illustrates a flow chart of an example method for performing vector division between two vectors in a neural network.

FIG. 5A illustrates a flow chart of an example method 500 for performing vector division between two vectors in a neural network. The method 500 may be performed by one or more components the apparatus of FIGS. 1 and 3.

At block 502, the example method 500 may include receiving, by a controller unit, a vector-divide instruction that includes a first address of a first vector, a second address of a second vector, and an operation code that indicates an operation to divide the first vector by the second vector. For example, the controller unit 106 may receive a vector-divide instruction that includes a first address of a first vector, a second address of a second vector, and an operation code that indicates an operation to divide the first vector by the second vector. A first vector may include one or more elements respectively denoted as A(1), A(2), . . . A(n) and, similarly, a second vector may include one or more elements respectively denoted as B(1), B(2), . . . B(n).

At block 504, the example method 500 may include receiving, by a computation module, the first vector and the second vector in response to the vector-divide instruction based on the first address and the second address. For example, the computation module 110 may be configured to receive the first vector and the second vector in response to the vector-divide instruction.

At block 506, the example method 500 may include respectively dividing, by one or more dividers of the computation module, each of the first elements by a corresponding one of the second elements to generate one or more division results. For example, the dividers 316 may be configured to divide the first elements correspondingly by the second elements.

At block 508, the example method 500 may include combining, by a combiner, the one or more division results into an output vector. For example, the combiner 318 may be similarly configured to combine the division results to generate an output vector. The output vector may be represented as A(1)/B(1), A(2)/B(2), . . . A(n)/B(n).

Figure 5B:
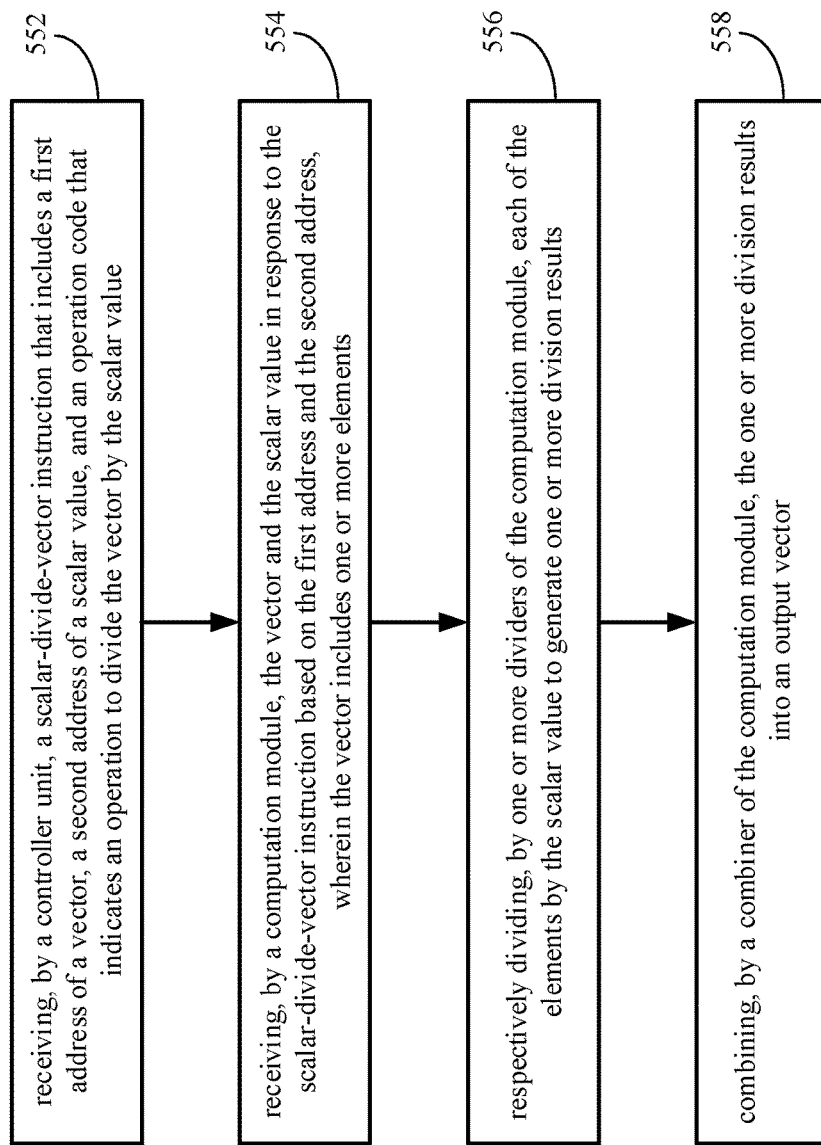
FIG. 5B illustrates a flow chart of an example method for performing vector division between a vector and a scalar value in a neural network.

FIG. 5B illustrates a flow chart of an example method 501 for performing vector division between a vector and a scalar value in a neural network.

At block 552, the example method 501 may include receiving, by a controller unit, a scalar-divide-vector instruction that includes a first address of a vector, a second address of a scalar value, and an operation code that indicates an operation to divide the vector by the scalar value. For example, the controller unit 106 may receive as SDV instruction that includes a first address of a vector, a second address of a scalar value, and an operation code that indicates an operation to divide the vector by the scalar value.

At block 554, the example method 501 may include receiving, by a computation module, the vector and the scalar value in response to the scalar-divide-vector instruction based on the first address and the second address. For example, the computation module 110 may be configured to receive a first vector A and a scalar value.

At block 556, the example method 501 may include respectively dividing, by one or more dividers of the computation module, each of the elements by the scalar value to generate one or more division results. For example, the dividers 316 may be configured to divide each element in the first vector by the scalar value.

At block 558, the example method 501 may include combining, by a combiner of the computation module, the one or more division results into an output vector. For example, the combiner 318 may be similarly configured to combine the subtraction results to generate an output vector. The output vector may be represented as A(1)/S, A(2)/S, . . . A(n)/S.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector operations in a neural network, comprising:
a controller unit configured to receive a vector-multiply-vector instruction that includes a first address of a first vector, a second address of a second vector, an operation code that indicates an operation to multiply the first vector with the second vector, and one or more register IDs that identify one or more registers configured to store the first address of the first vector, a first length of the first vector, the second address of the second vector, and a second length of the second vector; and a computation module configured to receive the first vector and the second vector in response to the vector-multiply-vector instruction based on the first address and the second address, wherein the first vector includes one or more first elements and the second vector includes one or more second elements, and wherein the computation module includes:
one or more multipliers configured to respectively multiply each of the first elements with a corresponding one of the second elements to generate one or more multiplication results, and
a combiner configured to combine the one or more multiplication results into an output vector.

2. The apparatus of claim 1,
wherein the vector-multiply-vector instruction further indicates a first length of the first vector, and
wherein the computation module is configured to retrieve the first vector based on the first address and the first length.

3. The apparatus of claim 1,
wherein the vector-multiply-vector instruction further indicates a second length of the second vector, and
wherein the computation module is configured to retrieve the second vector based on the second address and the second length.

4. The apparatus of claim 1, wherein the controller unit comprises an instruction obtaining module configured to obtain the vector-multiply-vector instruction from an instruction storage device.

5. The apparatus of claim 4, wherein the controller unit further comprises a decoding module configured to decode the vector-multiply-vector instruction into one or more micro-instructions.

6. The apparatus of claim 5, wherein the controller unit further comprises an instruction queue module configured to temporarily store the vector-multiply-vector instruction and one or more previously received instructions, and retrieve information corresponding to operation fields in the vector-multiply-vector instruction.

7. The apparatus of claim 6, wherein the controller unit further comprises an instruction register configured to store the information corresponding to the operation fields in the vector-multiply-vector instruction.

8. The apparatus of claim 7, wherein the controller unit further comprises a dependency processing unit configured to determine whether the vector-multiply-vector instruction has a dependency relationship with the one or more previously received instructions.

9. The apparatus of claim 8, wherein the controller unit further comprises a storage queue module configured to store the vector-multiply-vector instruction while the dependency processing unit is determining whether the vector-multiply-vector instruction has the dependency relationship with the one or more previously received instructions.

10. A method for vector operations in a neural network, comprising:
receiving, by a controller unit, a vector-multiply-vector instruction that includes a first address of a first vector, a second address of a second vector, an operation code that indicates an operation to multiply the first vector with the second vector, and one or more register IDs that identify one or more registers configured to store the first address of the first vector, a first length of the first vector, the second address of the second vector, and a second length of the second vector;
receiving, by a computation module, the first vector and the second vector in response to the vector-multiply-vector instruction based on the first address and the second address, wherein the first vector includes one or more first elements and the second vector includes one or more second elements;
respectively multiplying, by one or more multipliers of the computation module, each of the first elements with a corresponding one of the second elements to generate one or more multiplication results; and
combining, by a combiner of the computation module, the one or more multiplication results into an output vector.

11. The method of claim 10, further comprising obtaining, by an instruction obtaining module of the controller unit, the vector-multiply-vector instruction from an instruction storage device.

12. The method of claim 11, further comprising decoding, by a decoding module of the controller unit, the vector-multiply-vector instruction into one or more micro-instructions.

13. The method of claim 12, further comprising temporarily storing, by an instruction queue module of the controller unit, the vector-multiply-vector instruction and one or more previously received instructions, and retrieve information corresponding to operation fields in the vector-multiply-vector instruction.

14. The method of claim 13, further comprising storing, by an instruction register of the controller unit, the information corresponding to the operation fields in the vector-multiply-vector instruction.

15. The method of claim 14, further comprising determining, by a dependency processing unit of the controller unit, whether the vector-multiply-vector instruction has a dependency relationship with the one or more previously received instructions.

16. The method of claim 15, further comprising storing, by a storage queue module of the controller unit, the vector-multiply-vector instruction while the dependency processing unit is determining whether the vector-multiply-vector instruction has the dependency relationship with the one or more previously received instructions.

\* \* \* \* \*